United States Patent [19]
Yip et al.

[11] Patent Number: 4,577,933
[45] Date of Patent: Mar. 25, 1986

[54] GAP MODULATOR FOR HIGH SPEED SCANNERS

[75] Inventors: Kwok-leung Yip, Webster; Joseph J. Daniele, Pittsford, both of N.Y.

[73] Assignee: Xerox Corporation, Stamford, Conn.

[21] Appl. No.: 561,860

[22] Filed: Dec. 15, 1983

[51] Int. Cl.[4] .......................... G02F 1/33; H04N 3/08
[52] U.S. Cl. .................................. 350/358; 358/302; 358/206; 355/71
[58] Field of Search .................. 350/358, 6.8; 358/206, 358/300, 302; 346/160, 108; 355/71

[56] References Cited

U.S. PATENT DOCUMENTS

| | | | |
|---|---|---|---|
| 3,915,556 | 10/1975 | Roland et al. | 350/161 |
| 3,978,426 | 8/1976 | Logan et al. | 331/94.5 H |
| 4,054,363 | 10/1977 | Suematsu | 350/96 WG |
| 4,162,460 | 7/1979 | Gonda | 331/94.5 H |
| 4,380,373 | 4/1983 | Sprague | 350/356 |
| 4,400,740 | 8/1983 | Traino et al. | 350/358 |

FOREIGN PATENT DOCUMENTS 5433748  8/1977  Japan .......................... 350/96.11

OTHER PUBLICATIONS

Acousto-Optical Properties of Chalcopyrite Compounds, (Katzka et al.), 1977 Ultrasonics Symposium Proceedings, IEEE Cat. #77CH1264-ISU, p. 436.
Photoelastic Properties of Selected Materials & Their Relevance for Applications to Acoustic Light Modulators and Scanners (Dixon) Journal of Applied Physics, vol. 38, No. 13, Dec. '67.
(TUCC2) Efficient Gap Acousto-Optical Modulators (I. C. Chang et al.), Optical Society of America/IEEE Conference on Lasers & Electro-Optics Systems, Feb. 7, 1978.
Wideband Acousto-Optic Bragg Cells, (I. C. Chang et al.), IEEE Ultrasonics Symposium, 1981.

Primary Examiner—John K. Corbin
Assistant Examiner—Bruce S. Shapiro
Attorney, Agent, or Firm—Frederick E. McMullen

[57] ABSTRACT

An acousto-optic modulator for a high speed/high resolution raster output scanner, the modulator have a substrate composed of substantially pure gallium phosphide, with a relatively thin high frequency transducer comprised of a piezo electric layer sandwiched between metal electrodes and employing a conformable adhesive to prevent distortion of the crystal or transducer.

3 Claims, 10 Drawing Figures

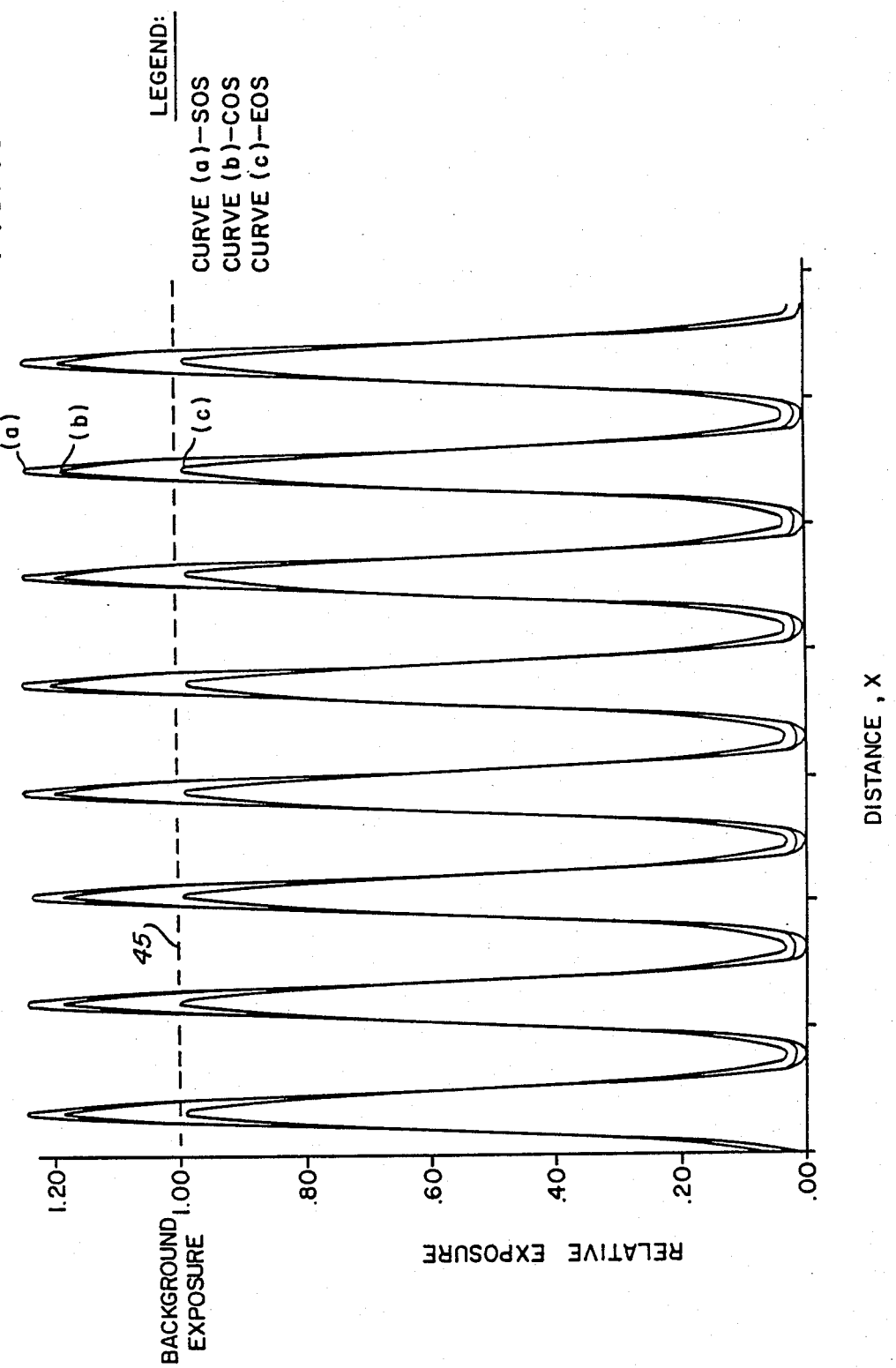

GAP MODULATOR FOR HIGH SPEED SCANNERS

The invention relates to acousto-optic modulators for raster output scanners, and more particularly to an improved acousto-optic modulator for high speed raster output scanners.

In a typical raster output scanner, a beam of high intensity radiation, normally derived from a laser, is selectively modulated in accordance with electrical signals representing the image to be produced, and the modulated beam scanned across the photoconductive surface of a recording member. Typically, scanning of the beam is carried out by means of a multifaceted rotating member such as a polygon. To perform the modulation, present day modulators typically comprise glass or tellurium dioxide. Such modulators however have limited bandwidth and high power consumption.

In scanners of the type postulated, certain minimum intensity levels must be achieved at the recording member if the desired level of exposure of the scanner recording member is to be obtained, and particularly if objectionable image background is to be erased. Accordingly, the intensity of the scanning beam transmitted by the modulator must be sufficient to offset system light losses due for example to inefficiencies and astigmatisms in the modulator and the other components of the system. For a typical pulse imaging scanner operated in the most stringent resolution mode, i.e. a one pixel on/one pixel off image pattern which is essential for halftone printing, it is necessary that the scanning beam center band and first order upper and lower side bands be transmitted and the bandwidth capability of the modulator must be sufficient to do this. Further, it is desirable to track the beam on the scanning element facets, and this requires added modulator bandwidth.

Typical present day acousto-optic modulators are glass or tellurium dioxide ($TeO_2$). However, due to the fundamental material properties of these materials, the operating bandwidth of these modulators is limited, and these modulator types do not have the bandwidth capabilities required to transmit a scanning beam of the necessary intensity over the entire scan line and permit facet tracking while still achieving the frequencies necessary for high speed, high resolution imaging.

The present invention seeks to overcome the aforementioned problems and provide an improved modulator capable of high speed/high resolution scanning applications while at the same time dramatically reducing modulator power requirements, the modulator beng combined with a scanner having a recording member, a high intensity beam of electromagnetic radiation, and a rotatable scanning element interposed between the recording member and the beam having a plurality of facets for intercepting the beam and repeatedly scanning the beam across the recording member; the modulator comprising: a substantially pure, undoped gallium phosphide crystal operable at frequencies of at least 500 MHz to provide very high speed processing of the image signals and to enable concurrent high speed printing on the recording member, the modulator crystal having a relatively wide bandwidth for a pulse imaging scanner operated in the resolution mode to assure capturing of at least the first pair of upper and lower sidebands together with the center band to assure sufficient light intensity at the scanner recording member to expose the recording member and provide the images; the scanning element facets having a facet width sufficient to capture the center band and at least the first pair of upper and lower sidebands for scanning onto the recording member.

IN THE DRAWINGS

FIG. 10 is an exposure plot of a one pixel on/one pixel off image pattern for the modulator of the present invention comparing scanning beam exposure with the optimum intensity level required for background removal at various points along the scan line.

Figure 1:
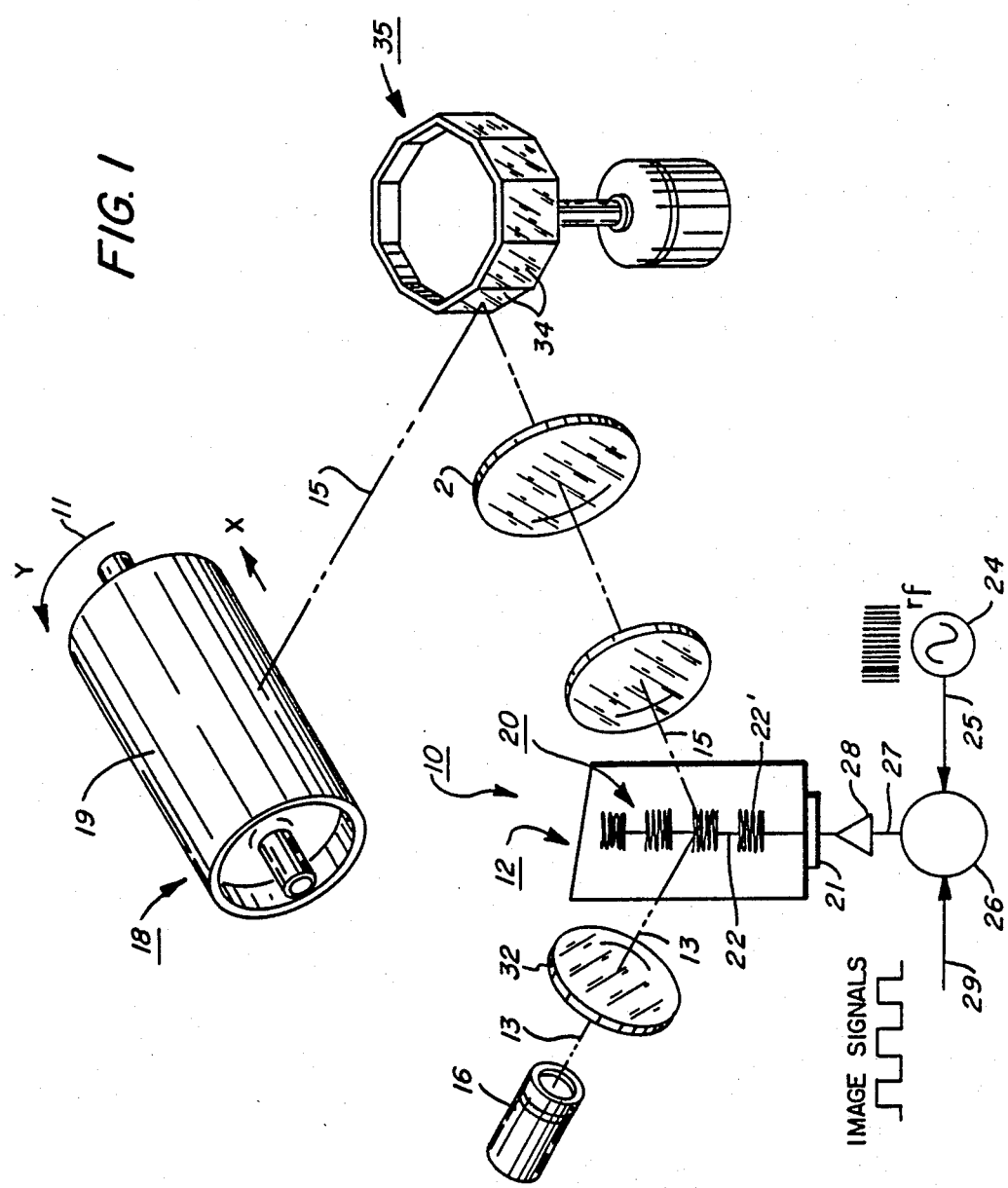
FIG. 1 is a schematic view illustrating an exemplary raster output scanner having a rotatable polygon for scanning a high intensity beam across the photoconductive surface of a recording member with an acousto-optic type modulator for modulating the scanning beam in accordance with an image signal input.
Figure 2:
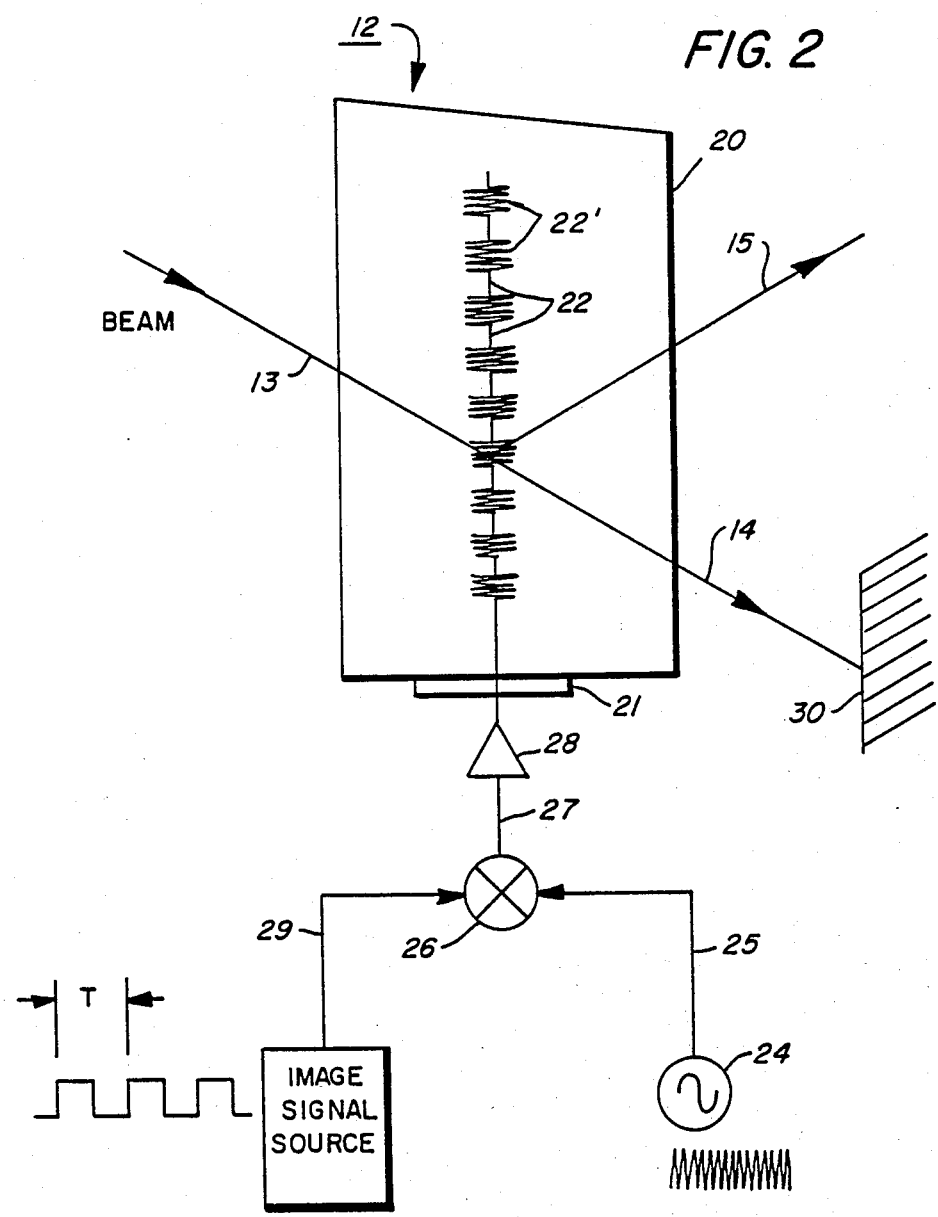
FIG. 2 is an enlarged view of the modulator section of the scanner shown in FIG. 1.

Referring particularly to FIGS. 1 and 2 of the drawings, an exemplary raster scanner, designated generally by the numeral 10 of the type adapted to incorporate the improved acousto-optic modulator of the present invention is there shown. Raster scanner 10 comprises a Raster Output Scanner or ROS type scanner wherein a beam 13 of high intensity radiation, i.e. light, modulated in accordance with image signals by a modulator 12, is scanned across the photoconductive surface 19 of a recording member 18 to expose the recording member in an image configuration. The recording member 18 is moved in the slow scan or Y direction shown by arrow 11 by suitable drive means (not shown). It will be understood that recording members having various xerographic and non-xerographic recording surfaces may be used. For example, recording member 18 may comprise a drum, belt, or plate, or photosensitive film, or coated paper web or cut sheet, etc. Beam 13 is derived from a suitable flux source of electromagnetic radiation such as laser 16.

As will be understood by those skilled in the art, the typical present day modulator comprises a block like element 20 of a suitable optical material such as glass (for example, a SF-8 modulator manufactured by Schott And Gen., Mainz, Germany) or tellurium dioxide (TeO$_2$) disposed athwart the path of the beam 13. A transducer 21 is coupled to one face of the modulator element 20 so that acoustic waves (represented by numerals 22, 22') generated by transducer 21 propagate through the element 20 along an axis substantially perpendicular to the axis of beam 13. A suitable r.f. generator 24 has its output coupled through line 25 to one input of a suitable signal mixer 26, the output of mixer 26 being coupled by line 27 and amplifier 28 to the input of transducer 21. Image signals, which may be derived from any suitable source, i.e. a communication channel, memory, etc. are coupled through line 29 to a second input of mixer 26.

The modulator shown in FIG. 2 is operated in the Bragg diffraction mode. Where the image signal input is a "0", mixer 26 suppresses the r.f. output of generator 24 and no acoustic wave (shown by numeral 22) is generated in element 20. In that circumstance, beam 13 passes undiffracted through the element 20 and emerges as zeroth order beam 14. Where the image input signal is a "1", mixer 26 couples the r.f. output of generator 24 to transducer 21 resulting in an acoustic wave (shown by numeral 22') being generated by transducer 21 in element 20. The acoustic wave diffracts the beam 13 into first order or writing beam 15. In the arrangement shown, first order beam 15 is utilized as the writing beam while zeroth order beam 14 is impinged against a suitable stop 30.

First order beam 15 passes through an imaging lens 32 and impinges against the mirrored facets 34 of a scanning element in the form of a rotating polygon 35. The beam 15 reflected from facets 34 of polygon 35 strikes the photoconductive surface 19 of recording member 18, the rotational movement of polygon 35 in effect sweeping the beam 15 in the fast scan or X direction across the photoconductive surface 19 to selectively expose, with each sweep, an image line. As a result, there is created, in accordance with the content of the image signal input to modulator 12, a latent electrostatic image on the photoconductive surface.

As will be understood by those skilled in the art, the photoconductive surface 19 of the recording member 18 is uniformly charged by a corotron preparatory to exposure by beam 15. Following exposure by beam 15, the latent electrostatic image created on the photoconductive surface 19 of recording member 18 is developed, transferred to a suitable copy substrate material such as paper, and fused to provide a permanent copy. Following transfer, the photoconductive surface 19 is cleaned to remove any residual developer prior to charging.

Figure 3:
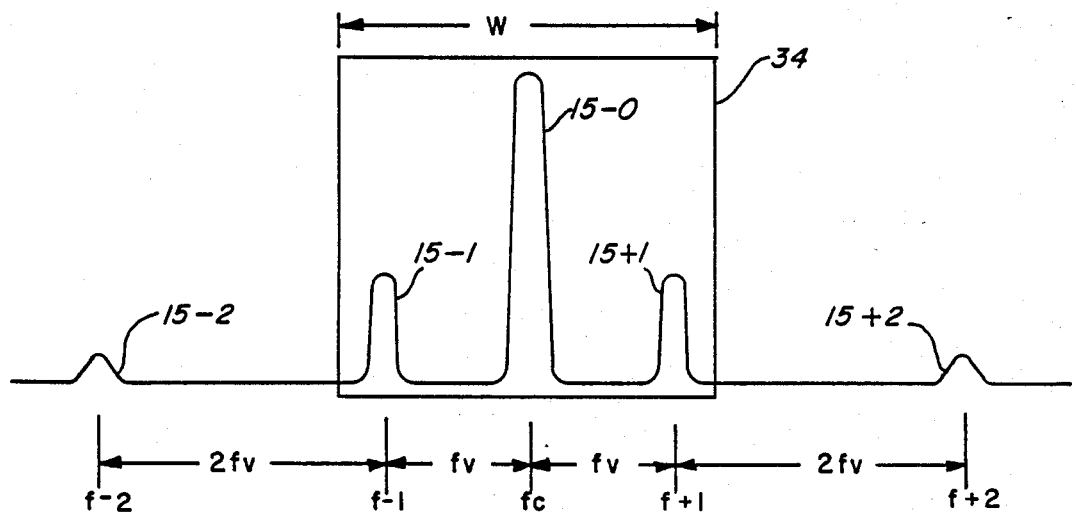
FIG. 3 is an enlarged view of one facet of the scanner polygon depicting the scanning beam center and first order upper and lower side bands thereon.

Referring now to FIG. 3, and as will be understood by those skilled in the art of pulse imaging scanners, the light distribution profile of the writing beam 15 at the output side of modulator 12 for a one pixel on/one pixel off image pattern is seen as a main band (or center band) of greatest intensity (identified by numeral 15−0) and upper and lower sidebands (identified by numerals 15+1, 15+2, . . . 15+n and 15−1, 15−2, . . . 15−n respectively) of progressively decreasing intensity. In order to permit pulse imaging and to accommodate what is generally considered to be the most stringent scanner operating mode (i.e. a one pixel on/one pixel off image pattern), it is highly desirable that the writing beam 15 be composed of the beam main band 15−0 and the beam first order upper and lower side bands 15+1 and 15−1 respectively. To capture the bands, the width W of facets 34 of polygon 35 is made sufficient to encompass main and first order upper and lower side bands 15−0, 15+1 and, 15−1 respectively.

If the center frequency of the main band is designated by $f_c$, the frequencies $f_{\pm n}$ of the upper and lower sidebands 15+1, 15+2, . . . 15+n and 15−1, 15−2, . . . 15−n respectively may be determined relative to main band 15−0 from the following relationship:

$$f_{\pm n} = f_c \pm \left( \sum_{i=1}^{n} i \right) f_v, \quad f_v = 1/T$$

where $f_v$ is the band separation frequency from the main band to the first order upper (or lower) side band, and T is time between successive image signals (T is shown in FIG. 2).

For example, if an image signal rate of 75M bits/sec is assumed with a T=26.67 nsec, the band separation ($f_v$) between the main band and the first order upper (or lower) side band is 1/26.67 nsec or 37.5 MHz. Accordingly, the first order upper and lower side bands 15+1 and 15−1 are displaced from the main beam by +37.5 MHz and −37.5 MHz respectively, the second order upper and lower side bands 15+2 and 15−2 are displaced from main beam 15−0 by +112.5 MHz and −112.5 MHz, etc. The bandwidth requirement for a polygon 35 having a facet width W (in frequency domain) sufficient to capture main band 15=0 and the first order upper and lower sidebands 15+1 and 15−1 respectively is determined by the relationship: W=1.25 (2 $f_v$). In this case, W=2.5 $f_v$=(2.5)(37.5)=94 MHz.

In the spatial domain, the facet width $W_s$ is given by the following equation:

$$W_s = \left( \frac{\lambda F}{V_a} \right) \left( \frac{W}{\cos I} \right)$$

where $\lambda$ is the wavelength of light, F is the effective focal length of the post-modulator optics (between modulator and polygon), $V_a$ is the velocity of sound in the modulator, and I is the optical angle of incidence at the polygon facet.

In order to keep the polygon to a reasonable size and to enhance ROS performance, it is desirable to track the writing beam 15 on the moving facets 34 of polygon 35 to maintain the point where the beam impinges on each facet substantially fixed as the beam is being scanned across the photoconductive surface 19 of recording member 18 from a Start Of Scan (SOS) position 37 through a Center Of Scan (COS) position 38 to an End Of Scan (EOS) position 39. This is called facet tracking. If the facet is not tracked, the edge of the facet will cut off part of the optical beam and cause spot size growth at the image plane, i.e. on photoconductive surface 19. In order to facet track, additional bandwidth is needed as may be seen by referring to FIG. 4. There, and assuming that a bandwidth of approximately 94 MHz is required in the first instance to provide a writing beam 15 composed of main band 15=0 and first upper and lower sidebands 15+1 and 15−1 respectively, and also assuming the high speed, high resolution application referred to and partial facet tracking of approximately 80%, a further 75 MHz of additional bandwidth is required to facet track the writing beam 15, i.e. to displace the point where the beam 15 strikes the moving facet in order to retain the point of beam impingement on the facet substantially fixed. In the example discussed, the total bandwidth required to provide a writing beam 15 of requisite intensity and to track the beam on the moving facets 34 of polygon 35 is approximately 169 Mhz (i.e. 94 MHz + 75 MHz).

Figure 4:
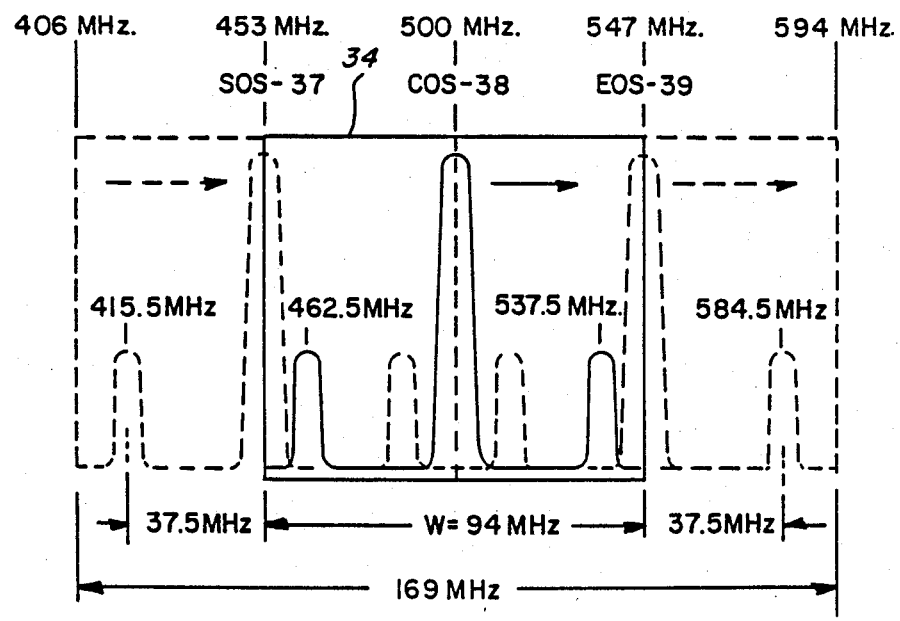
FIG. 4 is a second view of the polygon facet shown in FIG. 3 illustrating the effect of facet tracking the scanning beam thereacross.

In order to enable high speed, high resolution imaging, a center frequency $f_c$ of 500 MHz or greater is desirable. In FIG. 4, upper and lower sideband frequencies $f_{\pm 1}$ and the center frequencies at SOS and EOS positions 37, 39 respectively for a center frequency of 500 MHz at the COS position are shown.

Figure 5:
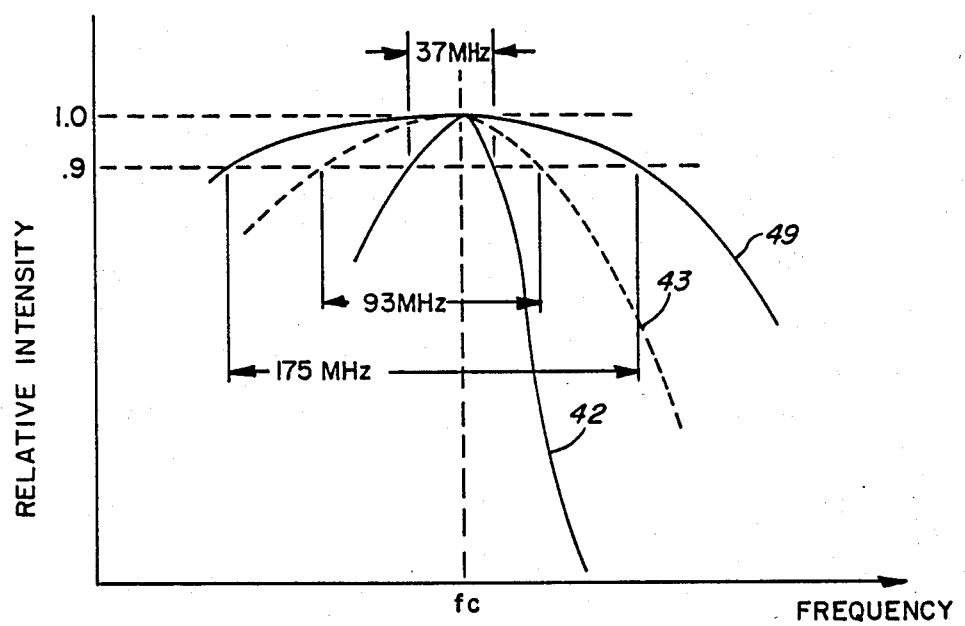
FIG. 5 is a graphical representation of the frequency response of typical modulators such as glass and tellurium dioxide compared with the modulator of the present invention.

Referring particularly to FIG. 5, intensity curves of Bragg diffraction for a typical glass modulator (identified by numeral 42) and a $TeO_2$ modulator (identified by numeral 43) are there shown. As can be seen, the intensity curves 42, 43, and particularly the intensity curve 42 for the glass modulator, are relatively narrow. As a consequence, the bandwidth available at a typical operating intensity level (i.e. 0.9 Relative Intensity) is limited. In the case of the glass modulator (curve 42), the bandwidth is approximately 37 MHz; in the case of the $TeO_2$ modulator (curve 43), the bandwidth is approximately 93 MHz.

Figure 6:
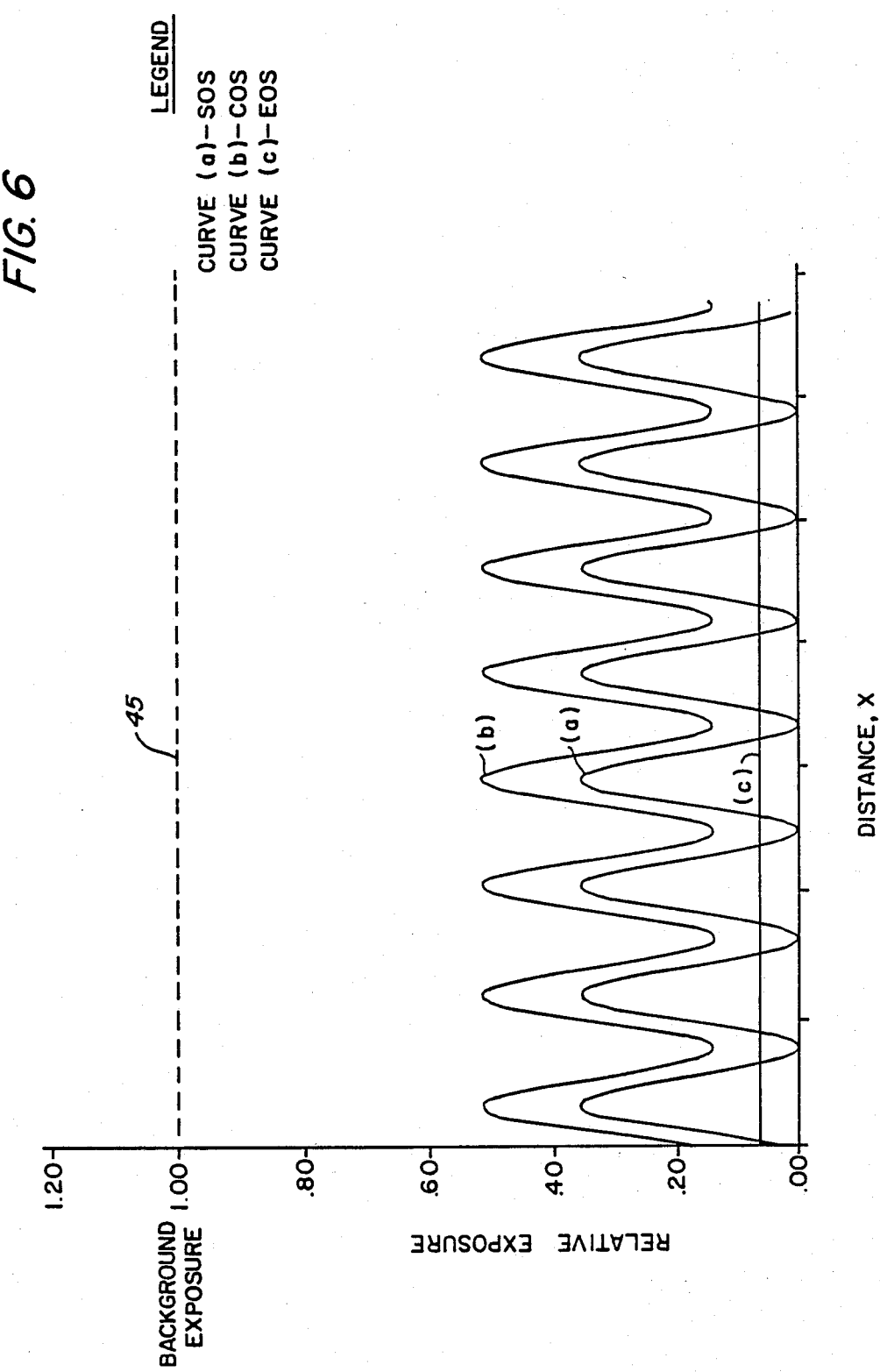
FIG. 6 is an exposure plot of a one pixel on/one pixel of image pattern for a typical glass type modulator comparing scanning beam exposure with the optimum intensity level required for background removal at various points along the scan line.
Figure 7:
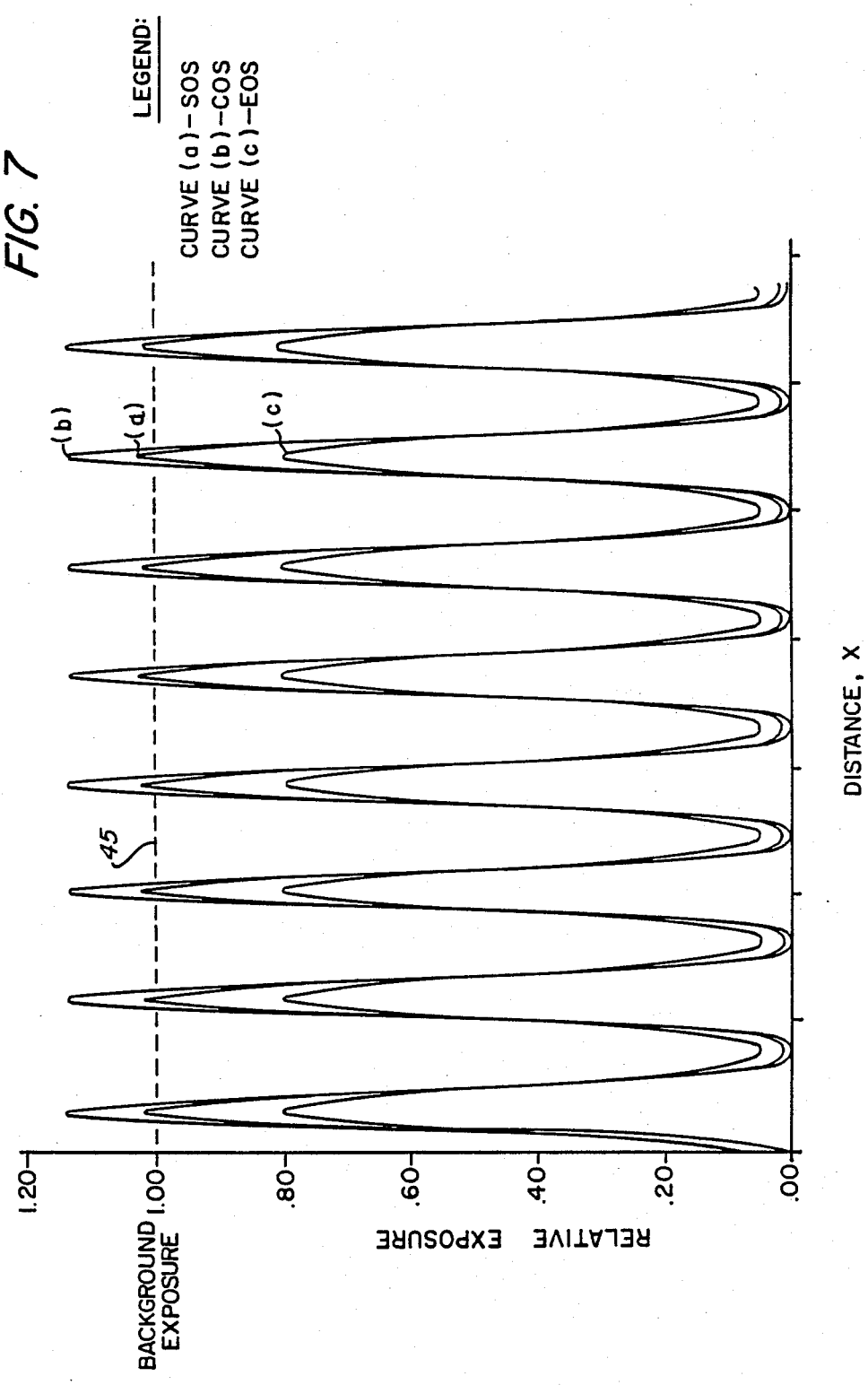
FIG. 7 is an exposure plot of a one pixel on/one pixel off image pattern for a typical tellurium dioxide type modulator comparing scanning beam exposure with the optimum intensity level required for background removal at various points along the scan line.

In FIGS. 6 and 7, the effect of the limited bandwidth available with the glass and $TeO_2$ modulators referred to above is shown. There, the exposure profiles for the glass and $TeO_2$ modulators are shown for the very stringent one pixel on/one pixel off image pattern, the plots being taken at the SOS, COS, and EOS positions 37, 38, 39 respectively. Line 45 represents the exposure level generally thought to be necessary to effect optimum discharge of the photoconductive surface 19 of recording member 18 in the image background areas to remove any objectionable background.

As can be seen from the exposure profile of the glass modulator, the intensity level required for optimum background exposure is not achieved at any of the SOS, COS, or EOS positions. In the case of the typical $TeO_2$ modulator, the intensity level required for optimum background exposure is achieved at the SOS and COS positions only, but not at the EOS position.

Further, the material properties of glass and tellurium dioxide are such that modulators of this type tend to be highly absorbent of the acoustic sound field generated by the transducer. Since acoustic absorption is approximately proportional to the square of the frequency, the higher the acoustic absorption of the modulator material, the lower the acoustic frequency that can be used. Also, the bandwidth of a Bragg modulator is proportional to the acoustic center frequency. As a result, the optimum center frequency ($f_c$) of glass and tellurium dioxide type modulators required to achieve the aforementioned bandwidths of 37 MHz and 93 MHz for glass and tellurium dioxide modulators is relatively low, typically 105 MHz for glass and 265 MHz for tellurium dioxide. This precludes the use of high frequency acoustic drives of approximately 500 MHz necessary for high speed, high resolution scanning.

As is believed apparent from the foregoing discussion, the usefulness of present day conventional modulators such as the glass and $TeO_2$ type modulators discussed for high speed high resolution image processing while at the same time permitting desired facet tracking of the writing beam on the moving polygon is comprised by the material and bandwidth limitations inherent in these types of modulators. Further, the power requirements of present day modulators is relatively large. For example, in the case of the glass type modulator discussed, the power required to drive the modulator is approximately 2 watts. In the case of the $TeO_2$ type modulator, the power required to drive the modulator is approximately 1 watt.

As will be understood, the significant advantage to higher bandwidth is the ability of the modulator to process more data at a higher rate. As a result, the number of spots per inch is increased. Since the number of spots per inch is increased, the beam spot size at the recording member is smaller and this in turn increases the facet size and thus requires higher modulator bandwidth.

Figure 8:
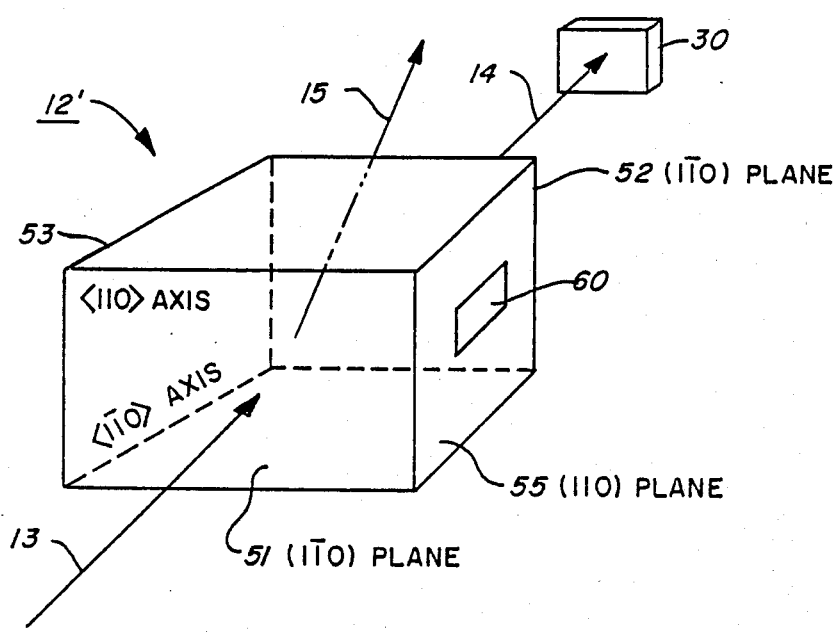
FIG. 8 is an enlarged isometric view of the modulator of the present invention.
Figure 9:
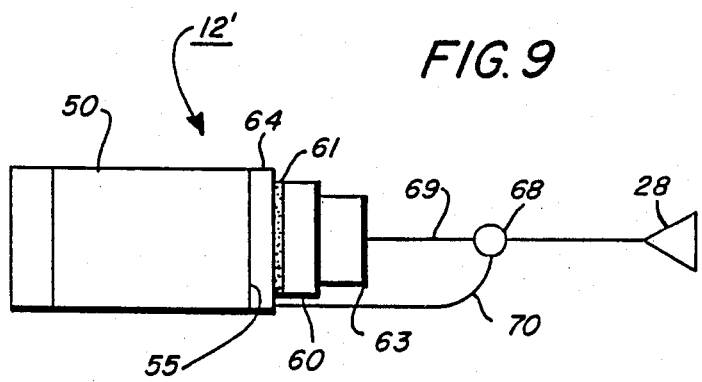
FIG. 9 is a cross sectional view of the modulator shown in FIG. 8 illustrating details of the transducer construction.

Referring now to FIGS. 8 and 9 of the drawings, the improved modulator of the present invention, designated generally by the numeral 12', is there shown. Modulator 12' is operable at center frequencies $f_c$ of 500 MHz and higher with a significantly higher bandwidth than present day modulators such as the glass and $TeO_2$ type modulators discussed above and is therefore able to process image data at a faster rate using a smaller spot size. Further, modulator 12' requires substantially less power, i.e. approximately 0.4 watt and is able to transmit in the infrared.

In FIGS. 8 and 9, the crystal substrate 50 of modulator 12' is highly pure (undoped) gallium phosphide (GaP) crystalline material or slightly n-doped material with carrier concentration preferably less that $5 \times 10^{16}$ $cm^{-3}$ and with a dislocation density less than $4 \times 10^5$ $cm^{-2}$. Substrate 50, which is generally rectangular in overall shape, has a polished input face 51 on which laser beam 13 impinges and a polished output face 52 through which zeroth and first order beams 14, 15 respectively exit. Side 53 of substrate 50 is preferably cut at a slant to suppress acoustic reflections.

A piezo electric transducer 60 of lithium niobate ($LiNbO_3$) for example is provided, transducer 60 being sandwiched between top and counter electrodes 63, 64 respectively. To achieve the high center frequencies $f_c$ desired (i.e. 500 MHz), piezo electric transducer 60 is extremely thin with a thickness of approximately 7.4 um. Counter electrode 64 preferably comprises a chromium-gold or nickel-chromium alloy deposited on side 55 of substrate 50. Counter electrode 64 is bonded to transducer 60 by means of a suitable conformable bonding material 61 which may comprise indium (In) or tin (Sn), the conforming bonding material 61 serving to prevent any minute particles, such as dust specks trapped therebetween from distorting the extremely thin piezo electric transducer 60. To enhance bonding, a chromium-gold or nickel-chromium alloy may be deposited on transducer 60 before transducer 60 is pressure bonded to counter electrode 64 on substrate 50 with bonding material 61. Top electrode 63 is preferably comprised of gold deposited on the outside surface of piezo electric transducer 60.

Piezo electric transducer 60 is electrically coupled to the output side of amplifier 28 by means of a dual line connector 68, one lead 69 of connector 68 being electrically connected to top electrode 63. The other lead 70 of connector 68, which serves a ground lead, is electrically connected to counter electrode 64.

Referring to FIG. 10, using modulator 12', the exposure profile is plotted for the same stringent one pixel on/one pixel off image pattern shown earlier for the present day type glass and $TeO_2$ modulators at the SOS, COS, and EOS positions 37, 38, 39 respectively. As can be observed, the exposure levels provided by modulator 12' are substantially above the level required for optimum background removal (represented by line 45) at both the SOS and COS positions 37, 38 respectively. The exposure level provided by modulator 12' is also substantially above that provided by the glass and TeO$_2$ type modulators for the EOS position 39, the exposure level provided by modulator 12' at the EOS position being almost equal to the exposure level required for optimum background removal. Also, the image contrast and image uniformity across the scan line provided by modulator 12' are substantially better than that provided by the glass and TeO$_2$ type modulators.

Referring again to FIG. 5, the diffracted intensity curve of modulator 12' is there shown and identified by numeral 49. As can be seen, the bandwidth of modulator 12' is approximately 175 MHz, nearly double that of the best of the present day modulators, i.e. the TeO$_2$ type modulator.

While the invention has been described with reference to the structure disclosed, it is not confined to the details set forth, but is intended to cover such modifications or changes as may come within the scope of the following claims.

We claim:

1. A pulse imaging scanner comprising:
   a recording member, the scanner being operable in a resolution mode to scan said recording member and create images thereon;
   a high intensity beam of electromagnetic radiation;
   a rotatable scanning element interposed between said recording member and said beam, said scanning element having a plurality of facets for intercepting said beam to repeatedly scan said beam across said recording member;
   an acousto optic type modulator for modulating said beam in response to image signals to create images on said member in response to the signal content of said image signals, said modulator comprising a substantially pure, undoped gallium phosphide crystal, said modulator having a center operating frequency of at least 500 MHz to permit high frequency modulation of said beam in response to said image signals for high speed, high resolution scanning, said modulator having an operating bandwidth of approximately 175 MHz at a relative operating intensity of 0.9 for capturing said beam center band and at least said beam upper and lower side bands to provide sufficient intensity to expose said recording member at said high frequency while enabling facet tracking of said beam on said scanning element facets;
   said scanning element facets having a facet width sufficient to capture said beam center and first upper and lower side bands whereby to scan said beam across said recording member without intensity loss.

2. The scanner according to claim 1 including:
   (a) a piezo electric transducer operably coupled to said crystal;
   (b) signal generating means for producing a steady state reference signal at a frequency of at least 500 MHz;
   (c) signal mixing means having one input electrically connected to the output of said signal generating means through a first connector means;
   (d) a source of said image signals;
   (e) second connector means for electrically connecting a second input of said signal mixing means with said image signal source;
   said signal mixing means combining said reference signal output by said signal generating means with said image signals output by said image signal source to provide a modulated drive signal; and
   (f) third connector means for electrically connecting a modulated drive signal output of said signal mixing means to said piezo electric transducer whereby said piezo electric transducer generates a high frequency acoustic wave through said crystal in accordance with said image signals.

3. The scanner according to claim 2 in which
   (a) said transducer comprises a thin piezo layer sandwiched between two metal electrodes,
   (b) said third connector means having a first conductor for electrically connecting said signal mixing means with one of said electrodes and as second conductor for electrically connecting said mixing means with the other of said electrodes;
   (c) first means for physically attaching one of said electrodes to said crystal;
   (d) second means for physically attaching said one electrode to said piezo layer, said second means comprising a conformable adhesive to avoid distortion of said thin piezo layer due to the presence of foreign material between said piezo layer and said one electrode; and
   third means for physically attaching said other electrode to said piezo layer.

* * * * *